United States Patent [19]

Herman et al.

[11] Patent Number: 5,374,191
[45] Date of Patent: Dec. 20, 1994

[54] ENHANCED DECK FOR FIREFIGHTER TRAINING SIMULATORS

[75] Inventors: Edward G. Herman, Lutherville, Md.; Fred W. Arbogast, Shrewsbury, Pa.; John C. Pershina, Freeland, Md.

[73] Assignee: AAI Corporation, Cockeysville, Md.

[21] Appl. No.: 45,075

[22] Filed: Apr. 12, 1993

[51] Int. Cl.$^5$ ............................................. G09B 9/00
[52] U.S. Cl. ................................................... 434/226
[58] Field of Search ....................................... 434/226

[56] References Cited

U.S. PATENT DOCUMENTS

| | | | |
|---|---|---|---|
| 4,303,396 | 12/1981 | Swiatosz | 434/226 |
| 4,983,124 | 1/1991 | Ernst et al. | 434/226 |
| 5,052,933 | 10/1991 | Rogers et al. | 434/226 |
| 5,055,050 | 10/1991 | Rogers et al. | 434/226 |
| 5,181,851 | 1/1993 | Layton et al. | 434/226 |
| 5,226,818 | 7/1993 | Felock et al. | 434/226 |

OTHER PUBLICATIONS

AAI Corporation, Fire Trainer T-2000, Gas-Fueled Firefighter Training System, Nov. 1992.

Primary Examiner—Gene Mancene
Assistant Examiner—Cindy A. Cherichetti
Attorney, Agent, or Firm—Venable, Baetjer, Howard & Civiletti

[57] ABSTRACT

An enhanced deck for generating live fire simulations of fuel spill and chemical fires and the like includes a receptacle for receiving a volume of fluid such as water within which is mounted a fuel burner array. Gaseous or liquid fuel is delivered to the burner assembly under pressure, resulting in the expulsion of fuel into the liquid, where the fuel transforms into vapor and rises to the surface of the receptacle. A support surface such as a metal grating or other rigid temperature resistant structure is provided at the upper end of the liquid receptacle and is at least partially immersed in the liquid so as to be in heat transfer relationship with the support surface. The fuel vapor is ignited at the support surface to generate a training fire. Preferably, a flow of liquid is provided to the receptacle to replace liquid that evaporates from the heat of combustion to maintain the support surface at or below a predetermined temperature.

Dispersion of the fuel can be enhanced through the provision of a diffuser that is positioned between the receptacle base and the surface of the liquid. The diffuser includes a plurality of apertures which define specific passages through which fuel vapor can pass as it ascends through the liquid, resulting in enhanced lateral dispersion of the fuel vapor at the surface of the liquid.

48 Claims, 3 Drawing Sheets

ENHANCED DECK FOR FIREFIGHTER TRAINING SIMULATORS

BACKGROUND OF THE INVENTION

1. Field of the Invention

The subject invention relates generally to fire simulation systems for training municipal, military, and other firefighter trainees as to the preferred procedures for suppressing and ultimately extinguishing fires. More particularly, the invention relates to a firefighter training system which is operable to produce a more realistic live fire simulation of fuel spill, chemical and similar types of fires, as well as to enhance system reliability by reducing system operating temperatures during and immediately following the conducting of a training scenario.

2. Description of the Related Art

Conventional firefighter training practices typically provide for the combustion of flammable materials, such as wood, straw, and other organic and inorganic materials, which are to be extinguished by the trainee upon the application thereon of sufficient quantities of an appropriate extinguishing agent. The extinguishing agent that is most commonly utilized is water, due principally to its availability, cost and widespread usage as a fire extinguishing material. However, these conventional training practices have come under scrutiny in recent years as a result of the relatively high injury rate, adverse environmental impact, and limited training effectiveness and trainee throughput that is associated with such practices. For example, the National Fire Protection Association (NFPA) reports that in the United States alone, nearly 6,000 training-related injuries were sustained by firefighters in 1988. Nevertheless, live fire training is a crucial and necessary component of firefighter training, for it most closely represents the overall environment a firefighter is likely to encounter during a genuine fire emergency. Unfortunately, conventional live fires that are set for the purpose of firefighter trainee education suffer from many of the very same hazards that are associated with genuine fire emergencies—unpredictability of fire propagation and its response to firefighter suppression tactics. As a consequence of these characteristics, it is oftentimes necessary for the trainee supervisors to themselves suppress the live fire prior to rendering perhaps life-saving assistance to a fallen trainee. Furthermore, because the very nature of a conventional live fire is unpredictability, it is not possible to accurately and readily reproduce a desired fire condition for a succession of firefighter trainees.

In an effort to address the foregoing deficiencies in firefighter training, live fire simulator systems have been implemented since the early 1970's which provide for, among other features, the substitution of various controllable arrangements of propane and natural gas-operable burners located within dedicated "burn rooms" for the prior practice of igniting various flammable props (i.e., wood or straw bundles) or even buildings to be razed. Illustrative of the newer generation of live firefighter training simulators is that disclosed in U.S. Pat. No. 4,303,396 and assigned to the United States of America as represented by the Secretary of the Navy. The simulator disclosed in this referenced patent, which is hereby incorporated by reference, provides a plurality of chambers, each of which can be provided with a fire from a fuel burner that is representative of a variety of different types of fires. This simulator is useful in educating firefighter trainees as to some general principles of fire extinguishment, such as spray nozzle control and various extinguishing agent application techniques. However, because a solid floor is used, applied extinguishing agent collects on the floor and poses a hazard to firefighter personnel due to slippage. Moreover, because a solid floor surface is provided, it is not possible to simulate fuel spill and similar types of floor level fires, as the burners are mounted above the floor on a platform. Accordingly, the disclosed trainer is not capable of rendering a realistic fuel spill-type of fire of the kind that firefighters can regularly be expected to encounter on board ocean going surface and sub-surface vessels, at petroleum refineries and chemical plants, municipal and military airports, and the like.

The United States Navy has commissioned several contractors to construct a surface vessel trainer that is operable to simulate fuel spill fires and the like. This trainer, known as the Device 19F4 Trainer, Basic Fire Fighting Aircraft, includes a number of gaseous propane-fueled burners that are mounted below a metal floor grating. The burners are operable to generate a live fire having flames that pass upward through the grating. Firefighter personnel apply water or foam extinguishing agents and advance along a path over the grating through which the flames pass as they suppress the fire. The gratings are typically 1.25 in. thick A36, stainless or other suitable grade of steel.

A number of critical operational, safety and simulation deficiencies have developed from use of the Device 19F4 trainer. Because the flames pass through the metal grating, the grating can heat to temperatures in excess of 850° F., at which temperature the grating can glow red hot and radiate considerable amounts of heat, posing a serious safety hazard to firefighter personnel. As extinguishing agent is applied to the fire, the grating is subjected to considerable thermal stress resulting from the rapid cooling effects of the extinguishing agent. As a consequence of this thermal stress, a problem has been experienced with grating warpage and/or cracking, necessitating replacement of the gratings well in advance of their originally-projected service life. As the gratings are quite expensive, the overall cost associated with system operation increases significantly. Further, grating warpage poses a safety hazard to firefighter personnel who, because of limited visibility during the training scenario due to the wearing of self contained breathing apparatus ("SCBA") gear, the generation of vapor from agent application to the heated grating and artificial smoke that is oftentimes introduced to enhance realism of the training scenario, can trip and fall onto the gratings and incur severe burns. Additionally, the grating does not provide for a realistic simulation of a fuel spill, chemical and similar fires of the type that can occur on board Naval vessels, as the flames do not collect and pool as they do in genuine fire emergencies on board ship.

The foregoing and other deficiencies are overcome by the new methods and apparatus of the present invention, the details of which are set forth in the following text and accompanying claims.

DETAILED DESCRIPTION OF THE PREFERRED EMBODIMENTS

Figure 1:
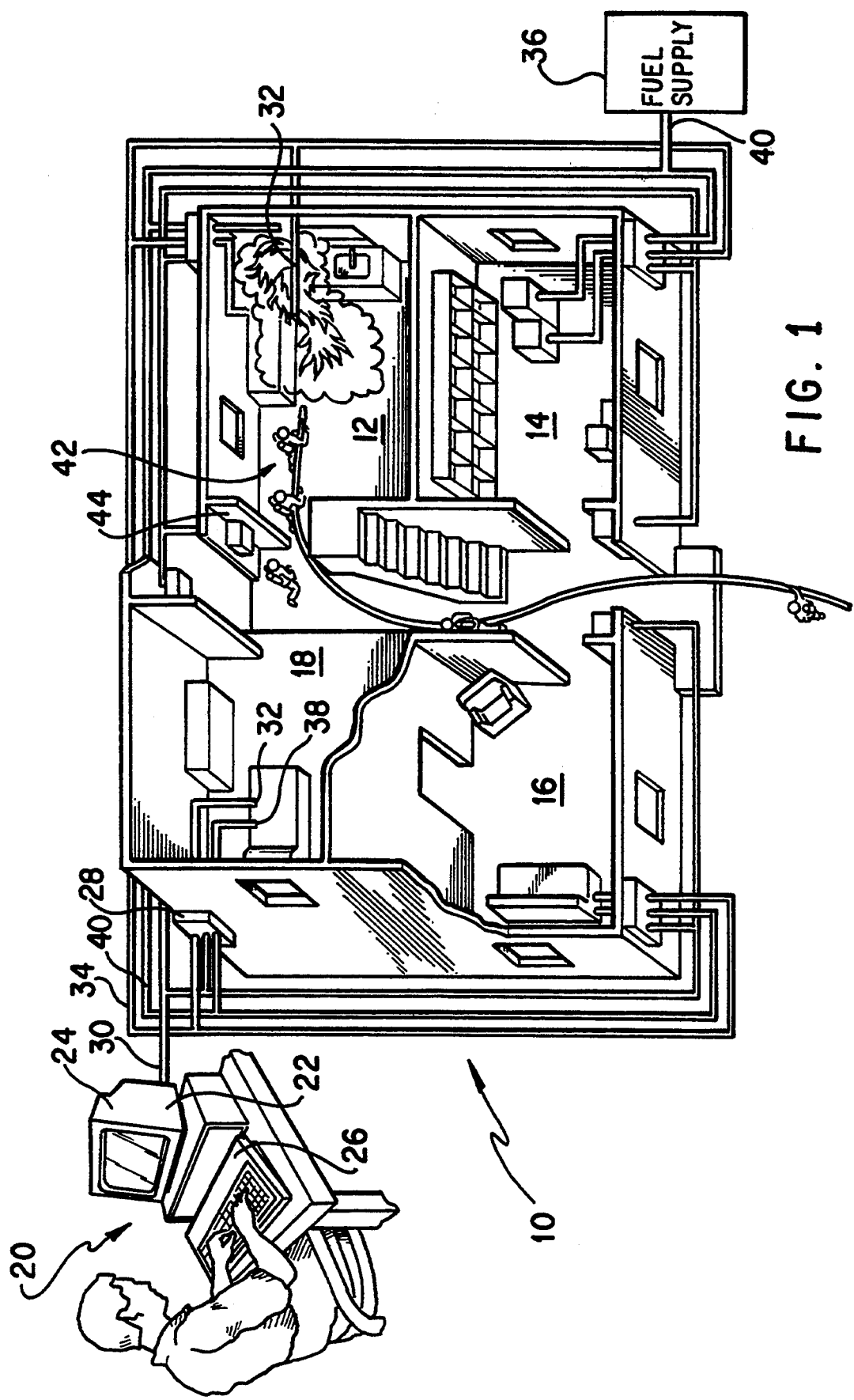
FIG. 1 is a schematic overhead view of a multi-compartment firefighter trainer facility of the type for FIG. 2 is a perspective side view illustrating details of a portion of one compartment of the trainer depicted in FIG. 1 in which the enhanced deck of the present invention is installed.

With reference to the drawings, wherein like reference characters represent corresponding parts throughout the various views, and with particular reference to FIG. 1, there is depicted a multi-compartmented firefighter trainer in accordance with the principles of the subject invention, designated generally by reference character 10. The trainer is comprised generally of a plurality of compartments or chambers 12, 14, 16 and 18, each of which is independently operable and controllable in the manner described below by a master processing unit 20 which may comprise a personal computer, workstation, or the like. However, it is to be understood that the principles of the subject invention are equally applicable to firefighter trainers having only a single compartment or "burn room", as well as for non-enclosed trainers such as the U.S. Navy's Device 19F4 firefighter trainer discussed above, aircraft rescue firefighter trainers ("ARFF's"), outdoor trainer pits, and the like.

As shown in the drawing, a master processing unit 20 is provided that comprises a central unit 22 which includes a central processing unit (CPU) and at least one disk drive, a display screen 24 such as a CRT, and a suitable data input device 26 such as a keyboard and/or manual input device (e.g., "mouse"). The master processing unit 20 can be positioned remote from the compartments 12, 14, 16 and 18 and is operable to communicate in a "master/slave" relationship in the manner described below, as indicated by control line 30, with a local automated processing unit 28 that is preferably associated with one or more of the compartments in which a fire simulation is to be conducted. The local processing unit 28 provides control signal inputs to the various devices such as fuel inlet valves, smoke generators and emergency fire suppression and ventilation apparatus described below.

Data regarding the operation and/or performance of the apparatus controlled by the local processing unit 28 is conveyed to the master processing unit 20 along the control line 30. Additionally, data sensed by various sensors, such as temperature sensors 32, is communicated to the local processing unit 28 along a sensor data line 34 for processing after which the processed sensor data can be communicated to the master processor 20 for display to the operator. Fuel such as propane (gaseous or liquid) or natural gas is housed on-site within a suitable storage tank 36 or is obtained from a local municipal supply line and is passed to gas burner assemblies, designated generally by reference numeral 38, that are positioned within the compartments through fuel supply lines 40. Signal inputs are received at the local processing units 28 for opening the appropriate fuel control valves associated with a given burner in the compartment 12, 14, 16 or 18 in which a training exercise is to be conducted. As indicated in the drawing, the preferred embodiment of the subject invention permits a firefighter crew, indicated in the drawing generally by reference character 42, preferably under the guidance of one or more supervisory personnel positioned behind an observation or fire wall 44, to advance through the trainer 10 to a specific one or more of the trainer compartments, such as compartment 12, to combat a live fire generated by the main burner assembly 38 in a manner well known in the art.

Suitable fire extinguishing agents include water, simulated foam, simulated PKP powder and $CO_2$ gas for application to a fire at the burner assembly 38. In a manner well known in the art, the fire at the burner assembly 38 can be optionally controlled to simulate various types of fires such as wood, chemical, electrical and grease fires and can be associated with mock-ups or props to further enhance realism of the training scenario. The applied extinguishing agent can optionally be collected for conveyance to, for example, one or more detectors for analysis as to volume and/or composition. Results of the analysis can be output to a computer printer for generation of a permanent record, or may otherwise be reported to the trainees and supervisor for critiquing as to, for example, the quantity and/or appropriateness of the extinguishing agent applied to the fire. In this regard, it is well known that particular extinguishing agents are more appropriate than others for extinguishing certain types of fires. For example, water is generally regarded as an inappropriate extinguishing agent for application to grease fires and can, in fact, exacerbate such fires. Obscuration of the trainees' vision in a manner likely to be encountered in a genuine fire emergency can optionally be provided by suitable simulated smoke generating apparatus (not shown), such as that described in co-pending patent application Ser. No. 07/707,868 filed on May 31, 1991 and assigned to the assignee of the subject invention, that are capable of producing simulated smoke.

Figure 2:
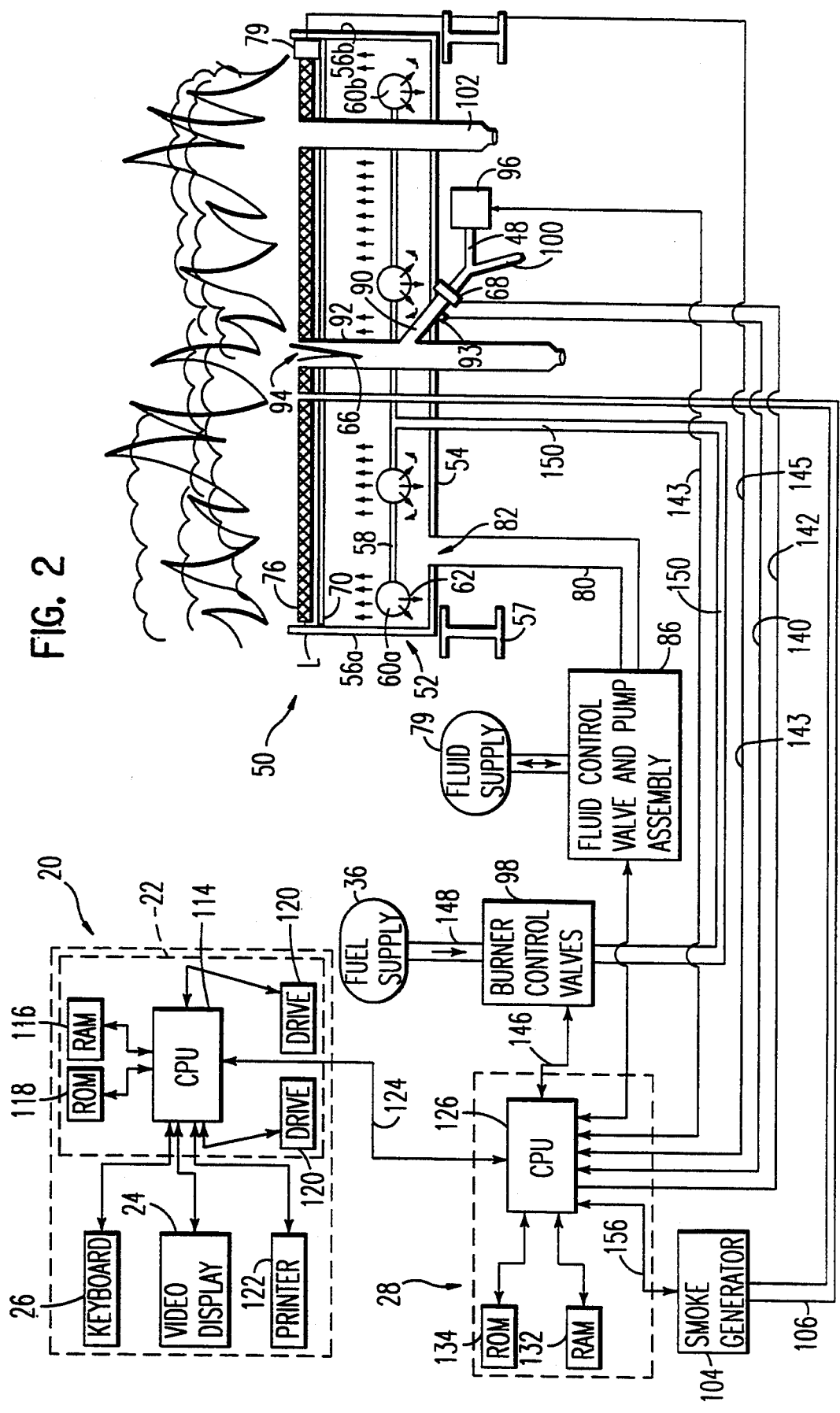
Figure 3:
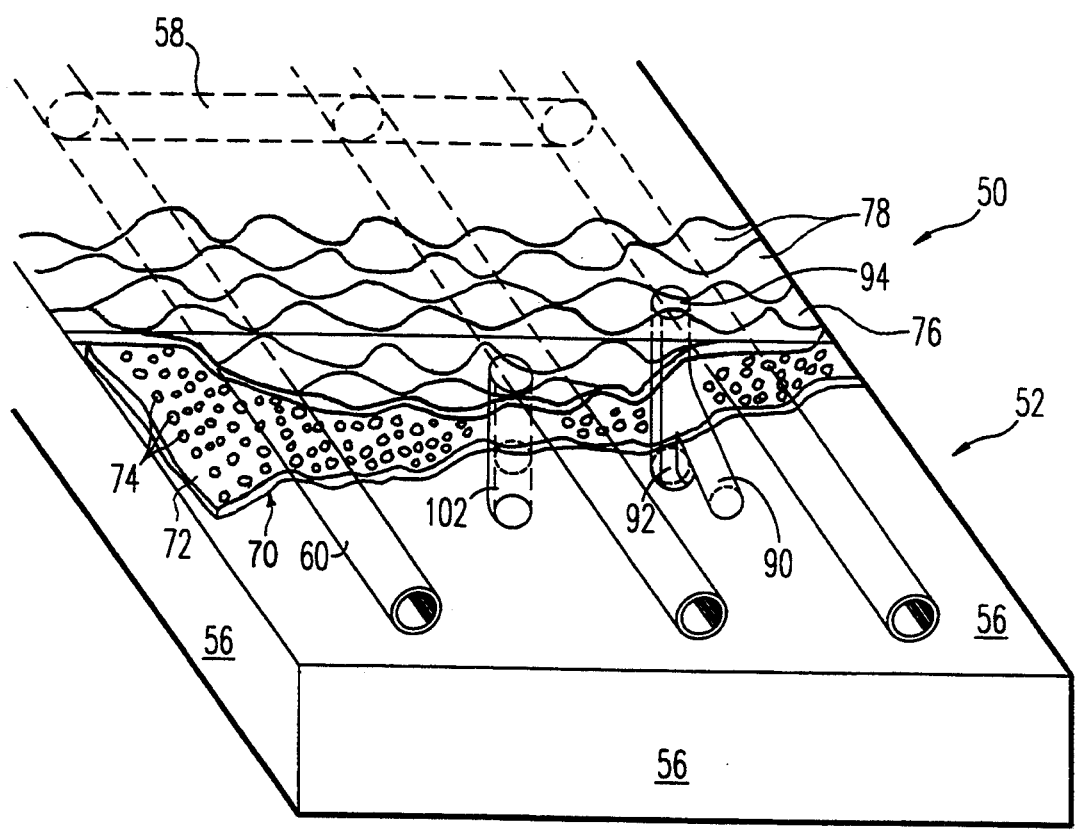
FIG. 3 is a perspective, partially cutaway view of an embodiment of the invention depicted in FIG. 2.

Details of the enhanced deck for firefighter trainers are illustrated in FIGS. 2 and 3. The enhanced deck, designated generally by reference character 50, provides for the generation of a live fire for firefighter training that is particularly effective at simulating pooled fuel and chemical fires. The deck 50 includes a receptacle 52 for receiving and retaining a quantity of a cooling fluid such as water. The receptacle 52 can be in the form of a tub, pan, excavated pit or similar structure that is adapted for receiving and retaining a fluid. In the illustrated embodiment, the receptacle 52 is in the form of a tub that is formed from steel or any other temperature resistant material having a base 54 and sidewalls 56 generally upstanding therefrom. The base 54 is supported by a pair of I-beams 57 that define a crawlspace that provides access to the underside of the receptacle.

Figure 4:
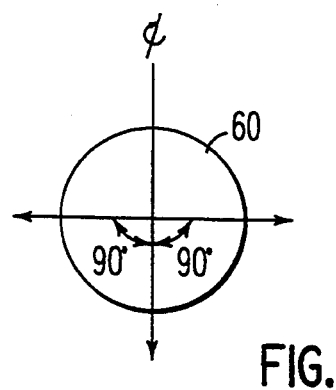
FIG. 4 is a cross-sectional view of a fuel burner element of the type used in the present invention.

The burner assembly 38 is received within the receptacle 52 and is mounted above the receptacle base by supports (not shown). The burner assembly includes a conduit 58 that is in fluid communication with at least one burner element 60 to supply the burner element with a suitable fuel such as gaseous or liquid propane or natural gas for combustion. Each burner element is provided with a plurality of apertures 62 through which supplied fuel is expelled under pressure from the burner element. The apertures can be arranged in one or more rows along a lower surface of the burner element in order that the fuel expelled through the apertures is directed toward the receptacle base 54 or one or more receptacle sidewalls 56 prior to passage to the surface of the fluid filled receptacle 52. For example, several rows of apertures are formed along the lower surface of the leftmost burner element 60a of the receptacle 52 depicted in FIG. 2. One of these rows of apertures extends along the longitudinal centerline C of the burner element 60a (FIG. 4). Another of the rows of apertures extends along a lower side surface of the burner element 60a along a line that is positioned at an included angle of from about 0° to about 90° to a vertical plane in order to direct a portion of the expelled fuel toward the left receptacle sidewall 56a for gaseous and liquid fuel applications. In an analogous manner, apertures 62 are formed in the rightmost burner element along the burner element centerline and at an included angle of from about 0° to about 90° to a vertical plane to the right of the centerline to direct fuel toward the base 54 and toward the right receptacle sidewall 56b, respectively.

In the illustrated embodiment, burner elements positioned medially or inward of the burner elements 60a and 60b are provided with three rows of apertures to provide for a greater dispersion of expelled fuel. Preferably, the apertures 62 are formed along the lower surface of the burner element along rows that are no more than about 180° apart from one another. The apertures 62 can be formed in an aligned or staggered (i.e., alternating) pattern along the length of the burner element 60; however, it is preferred that the aggregate surface area of the apertures for a single burner element 60 not exceed about 56% of the cross-sectional area of the fuel supply conduit 58.

Gaseous or liquid fuel that is expelled from the burner elements 60 vaporizes as it passes through the fluid contained within the receptacle in a known manner and, due to its specific gravity, rises to the surface of the fluid, where it is ignited by one or more flames or sparks 66 emitted by an ignitor assembly 68 that will be described in detail below.

A diffuser 70 (FIGS. 2 and 3) can optionally be interposed between the burner apertures 62 and the surface of the fluid contained within the receptacle to further enhance diffusion or dispersion of the fuel gas or vapor than would otherwise occur as the fuel vapor rises to the surface of the fluid. As is shown in FIG. 3, the diffuser is configured as a sheet 72 of a suitable temperature resistant material such as steel or aluminum that is formed with a multitude of apertures 74 that extend through the sheet. The arrangement of apertures defines specific passages through which the fuel vapor can travel as the vapor ascends to the fluid surface, thereby reducing the incidence of pooling of vapor near the center of the receptacle that could occur in the absence of the diffuser, and enhancing lateral distribution of the fuel vapor within the receptacle.

A firefighter support surface or floor 76 in the form of a metal grating or other suitable, temperature resistant and weight bearing structure, overlies the receptacle and provides a surface over which firefighter trainees can pass during the course of a training scenario as they suppress the fire. The support surface or grating 76 is configured as a generally open structure having a multitude of interstices 78 (FIG. 3) through which the fuel vapor can pass as it ascends from the burner elements 60 and through the apertures 74 optional diffuser 70. The support surface 76 is at least partially submerged in the fluid received within the receptacle, and is preferably at least 50% to 80% submerged in the fluid to facilitate heat transfer from the support surface to the fluid during the course of a training scenario, as will be further described below. The interstices 78 also serve to collect fuel vapor and inhibit migration of the vapor within the receptacle prior to its combustion, further enhancing the simulation of a pooled fuel or chemical fire.

The temperature of the support surface, and optionally that of the receptacle fluid as well, can be sensed by one or more appropriate sensors 79, which are preferably in the form of thermocouples. The thermocouple or other suitable temperature sensor 79 is connected to one or more portions of the support surface 74 and is operable to generate a signal that is representative of the sensed support surface temperature. Use of a thermocouple for the sensor allows for the detection of agent application in a manner that is more fully described in U.S. patent application Ser. No. 796,938 filed on Nov. 25, 1991 and entitled "Firefighter Training System With Thermal Mass Agent Detection", which has been assigned to the assignee herein, the disclosure of which is hereby incorporated by reference.

Fluid such as water is stored in a supply tank 79 and is supplied to the receptacle 52 through a fluid conduit 80 (FIG. 2) that terminates at an outlet 82 formed in the receptacle base 54. The flow of fluid from the supply tank 79 to the receptacle 52 is controlled by a control valve and pump assembly 86, preferably in accordance with control input in the manner described below. The control valve and pump assembly is preferably operable to effect fluid delivery and removal (as will occur with fluid draining for changeover or system winter storage) from the receptacle 52 in a manner well known in the art.

As has been discussed previously, fuel vapor that collects at the surface of the fluid contained by the receptacle 52 is ignited by a flame or spark 66 emitted by an ignitor assembly 68 (FIG. 2). The ignitor assembly 68 is preferably in the form of a suitable nozzle mixing pilot burner, such as the Series 3.5-3.0 NMP-S or 51.5-5.0 NMP-S manufactured by Eclipse Combustion of Rockford, Ill. The ignitor assembly is mounted within a flame shaft 90 of a conduit 92 that extends through the receptacle base 54 and to the upper surface of the walk surface or grating 76. Operation of the ignitor assembly 68 can be monitored by a suitable sensor 93 such as a UV monitor or flame rod.

The conduit 92 is provided with a generally inverted Y-shaped configuration and is constructed such that a primary portion of the conduit extends generally transverse with respect to the receptacle walk surface. The flameshaft 90 is oriented at an angle of about 45° with respect to the conduit 92 and is configured such that the Y branch portion of the shaft 90 and conduit 92 through which the pilot flames or sparks pass is received within the receptacle 52 and immersed in the fluid received within the receptacle to facilitate cooling of the flame shaft 90 and conduit 92.

Extinguishing agent applied by firefighter trainees can drain down through the conduit 92 at the grating surface for removal. Because of the generally transverse orientation of the conduit 92 and the angular orientation of the flame shaft 90 with respect to the conduit 92, the majority of extinguishing agent that is received within the conduit mouth 94 travels down the conduit and past the flame shaft 90.

A source of positive pressure 96, such as the Regenair$^R$ Series R3105-1 and R3305A-1 blowers manufactured by Gast Manufacturing Corp. of Benton Harbor, Mich. is provided downstream of the ignitor assembly 68 in a lateral, auxiliary branch 98 of the flame shaft 90. The primary branch 100 of the flame shaft 90 is angled downwardly from the flame shaft at an angle of about 45° with respect to the longitudinal axis of the flame shaft to facilitate the flow of fluid and/or extinguishing agent that enters into the conduit 92 and flame shaft 90 from the facility. Removal of applied extinguishing agent can be further facilitated through the provision of one or more drain conduits 102 that extend from the upper surface of the support surface or grating 76 through the base 54 of the receptacle. Fluid and/or agent that enters the conduit 92, flame shaft 90, primary branch 100 and drain conduits 102 can be collected, separated from one another (to the extent necessary), filtered and/or recycled for reuse in the firefighter trainer. The foregoing drain conduits can optionally be tapered at their lower ends to inhibit flow therethrough and thereby facilitate combustion air retention at the support surface 76.

As propane and natural gas are relatively clean burning fuels, realism of the training scenario can be further enhanced through the provision of a visual obscuration medium such as simulated smoke. To that end, a generator 104 of suitable simulated smoke can be provided adjacent to the receptacle to supply simulated smoke for the training scenario. Preferably, the simulated smoke is conveyed from the smoke generator 104 in a conduit 106 through the receptacle base 54 for dispersion at the upper surface of the support surface or grating 76, preferably near the conduit mouth 94 through which the pilot flame 66 or ignition spark passes to ignite the fuel vapor. Arrangement of the simulated smoke flow in this manner enhances the simulation, for it creates the appearance that the smoke is emanating from the fire itself, as would be the case in a genuine fuel or chemical fire emergency.

Details of the electromechanical control apparatus for the flashover simulation of the subject invention are illustrated in FIG. 2. With reference to the drawing, the master data processing unit 20 is in the form of a personal computer or workstation. Operation of the processing unit 20 is controlled by a central processing unit (CPU) 114, such as the model SB286SC CPU marketed by Industrial Computer Source, Inc. of San Diego, Calif. A random access memory (RAM) 116 is electrically connected to the CPU 114 and stores OSS software and provides working memory for the CPU. A read-only memory (ROM) 118 is also provided which stores various programs that are needed for input/output, power-up, self-test diagnostics, and booting procedures for the CPU 114. One or more disk drives 120 can be provided to interface with the CPU 104. The above-referenced video monitor 24 (FIG. 1) and data input apparatus, such as the keyboard and/or mouse 26, are provided to permit human operator interaction with the CPU 114. A printer 122 can optionally be connected to the CPU 114 to provide a hard copy of the data related to the fire simulation, such as graphics and/or tabular data relating sensed temperature, quantity of extinguishing agent applied during the training exercise, and flame height at the burner assembly 38 as a function of time. Alternatively, such data can be stored in RAM 116 for subsequent recall and display to the trainee(s) at one or more console monitors 24.

The master processing unit 20 can be coupled to the local processing unit 28 at the facility (also known as a "burn building") which houses the one or more trainer compartments or open simulator areas by way of a bidirectional data, address and control bus 124. Alternatively, the master processing unit 20 can be coupled directly to related hardware for controlling fuel flow to the burner and igniter assemblies, the release of simulated smoke, and the like, as will be described in detail below. In a preferred aspect of the invention, the CPU 114 of the main processing unit 20 is coupled to the CPU 126 of the local processing unit 28. As is the case with the master processing unit 20, the local processing unit 28 includes a system RAM 132 and a ROM 134, along with suitable programing and hardware interfaces for communicating with and controlling various hardware interfaces. These devices include the fuel burner control valves 98 and smoke generator 104 that are associated with the firefighter training simulator of the subject invention, as well as any A/D converter apparatus that may be required for the processor to receive and interpret signal inputs received from analog sources. Preferably, outputs from the ignitor 68, UV sensor 93 and temperature sensor 79 are in the form of digital data for direct transmission to the CPU 126.

The CPU 126 of the local processor unit is connected to the various sensor and hardware devices associated with each simulator training area or compartment, such as compartment 12 illustrated in FIG. 2. Data from the UV sensor 93 relating to operation of the burner ignitor 68 is transmitted to the CPU 126 along a data line 140, whereas ignition signal input to the ignitor is transmitted along a communication line 142.

Fuel is conveyed under pressure from the tank 36 to the burner unit 38 upon receipt by the burner control valve system 98 of appropriate signal commands transmitted along the communication line 146. The valve control system includes a valve assembly, such as an appropriate motorized linear valve or ganging of solenoid valves that is mounted in an independently controllable manner within the fuel flow path to each of the respective burner assemblies 38. Upon receipt of appropriate signal input from the CPU 126, the valve control system 98 is operable to bias the motorized linear fuel control valves between a closed position and an open position so as to allow for precise metering of fuel under pressure from the tank 36 (through conduit 148) and into the burner fuel supply line 150 for delivery to the burner assembly 38. In instances where an array of solenoid valves are employed for fuel metering, the valves are selectively controlled to provide for the requisite level of fuel flow.

CPU 126 control of the smoke generator 104 is implemented along communication line 156. Upon receipt of an activation signal input from the CPU 126, smoke, which is preferably of the simulated, non-toxic variety such as that produced by the smoke generator disclosed in commonly-assigned U.S. patent application Ser. No. 07/707,868 entitled "Method and Apparatus for Controllably Generating Simulating Smoke" that was filed on May 31, 1991, the disclosure of which is expressly incorporated by reference, and improvements to the smoke generator disclosed in the referenced application, is conveyed along a conduit 106 to the receptacle 52, preferably adjacent to the outlet 94 of the conduit 92 through which the pilot flame or spark 66 extends, or any other suitable outlet adjacent to the enhanced deck of the present invention, for the purpose of further enhancing the realism of the simulation. The CPU 126 can be operated in a manner well known to persons of ordinary skill in the art to control any of a variety of other simulator components, such as compartment ventilation, lighting, and other hardware. Signal data relating generally to the enablement, status and control of the foregoing hardware components discussed above is exchanged between the local and main processing systems along the data bus 124, thereby minimizing the complexity of communication and control exchanged between these two processing systems. The foregoing communication and control hierarchy is further advantageous in situations where the master processing unit 20, for any of a variety of reasons, is not located on-site at the burn building.

In a preferred aspect of the invention, the CPU 114 commands the CPU 126 to initiate a test of the fuel pressure and fuel control valves 98 in order to confirm their operability prior to the implementation of the training exercise This test is accomplished by CPU 114 accessing of appropriate program data stored in RAM 116, as described above, resulting in generation of an appropriate input signal to the CPU 126 of the local processing unit 28 on-site at the trainer compartment at which the firefighter training exercise is to be undertaken. The test is implemented upon accessing by the CPU 126 of test-related program data stored in RAM 132 in a manner known in the computer art, which effects signal output from the CPU 126 along communication line 146 to command the hardware at the burner control valve assembly 98 to undergo a prescribed regimen of openings, closings and system pressure checks. This pre-implementation test can further encompass test-firing of the burner ignitor 68 and the monitoring thereof by the UV sensor 93 associated with the ignitor by means of signals exchanged with the CPU 126 along the respective communication lines 142 and 140, as well as confirming operation of the blower 96 by monitoring at the CPU 126 blower status signal data that can be conveyed along the data line 143.

A training scenario can be commenced upon successful completion of the test regimen. The scenario can involve a single enhanced deck 50 in accordance with the foregoing description, or can alternatively include a plurality of such enhanced decks arranged into discrete, independently controllable zones to allow for simulation of spreading fires and the like. For each enhanced deck, fuel is supplied to the burner assembly 38 thereof in accordance with computer signal input to the control valve assembly 98. Appropriate signal input is also directed to the pilot assembly 68 that is associated with each burner assembly 38 to effect emission therefrom of pilot flames or sparks to ignite fuel vapor that passes from the burner elements to the surface of the liquid within the receptacle tub 52. Operation of the pilot assembly is confirmed by output signal data from the UV sensor 93, in the absence of which the CPU 126 is operable to terminate fuel delivery to the burner assembly 38 by closing the fuel control valve assembly 98.

The temperature of support surface or grating 76 is monitored by the temperature sensor 79 to ensure that the temperature is maintained within a preferred operational temperature range of from about 160° F. to about 210° F. Signal data indicative of the sensed temperature is conveyed to the CPU along data line 145. Grating temperature is controlled by regulating the quantity of fluid replenishment flow into the receptacle through the fluid control valve and pump assembly 86. Signal input from the CPU 126 is directed to the control valve and pump assembly 86 and is of an appropriate form such that fluid is delivered to the receptacle at a rate which not only replaces fluid removed due to evaporative loss, but also effects cooling of the walk surface 76 to the desired temperature. As has been mentioned previously, conventional metal grating support surfaces can attain temperatures in excess of 850° F., and even attain 1,000° F. or more, in the absence of cooling fluid during the course of a training scenario. Temperatures of this magnitude pose a serious, and potentially life-threatening danger to firefighter personnel, as most SCBA gear is rated for temperatures of only up to about 475° F. Accordingly, it is highly desirable to minimize these temperatures, and the present invention and various modifications and adaptations thereof that are possible from the foregoing disclosure and to which the accompanying claims are directed, overcomes this problem.

What is claimed is:

1. A system for use in a firefighter trainer for generating a live fire for the training of firefighters, comprising:
   a reservoir having a base and a sidewall extending upwardly therefrom to receive a volume of liquid within said reservoir;
   at least one fuel conduit mounted within said reservoir and operable to receive a flow of fuel, said fuel conduit having at least one outlet port to release said fuel into the liquid for passage to the surface of the liquid, said liquid being maintained at a pressure that is less than the pressure of said fuel prior to release of said fuel into said liquid;
   a fuel ignition system operable to ignite the fuel released from said outlet port at the surface of the liquid; and
   a firefighter support surface comprising a fuel dispersing member that is disposed to be at least partially submergible below the surface of said liquid, said dispersing member comprising means for facilitating dispersion of fuel vapor below the surface of said liquid, prior to ignition of the vapor above the surface of the liquid.

2. The system according to claim 1, further comprising a system for sensing the temperature of said support surface.

3. The system according to claim 2, wherein said temperature sensing system comprises a thermocouple that is coupled to said support surface.

4. The system according to claim 1, further comprising a liquid replenishment system connected to said reservoir and operable to supply additional liquid to the reservoir.

5. A system according to claim 4, further comprising a system for controlling liquid flow into said reservoir to maintain said sensed support surface temperature at or below a predetermined temperature.

6. The system according to claim 1, further comprising a system for draining an extinguishing agent that is applied by a system user.

7. The system according to claim 1, wherein said ignition system comprises an ignitor assembly that is operable to generate a spark or flame for delivery through said reservoir to said support surface.

8. The system according to claim 7, wherein a conduit is provided for delivering said spark or flame to said support surface, said conduit being operable to receive an extinguishing agent that is applied by a system user.

9. The system according to claim 7, wherein said ignition system further comprises a source of positive pressure that is operable to bias said spark or flame toward said support surface.

10. The system according to claim 1, further comprising a source of a visual impairment medium for delivery to said support surface.

11. The system according to claim 10, wherein a conduit is provided for delivering said visual impairment medium to said support surface through said reservoir.

12. The system according to claim 1, wherein said dispersing member is provided with a plurality of apertures which define specific passages through which at least one of said fuel and said liquid can pass.

13. The system according to claim 12, wherein said dispersing member is formed of a heat conductive material.

14. Firefighter training equipment, comprising:
a tank disposed to hold a body of liquid, said tank having a bottom and a side wall;
means within said tank for releasing into said body of liquid beneath the surface of said body of liquid pressurized fuel in the form of a plurality of separate, spaced-apart streams of fuel; and
a diffuser disposed in said tank at an elevation adjacent to, but below, the surface of said body of liquid, and above said fuel release means, said diffuser being formed with a plurality of generally transversely-extending apertures disposed between its upper and lower surfaces, said diffuser being interposed between the portion of said body of liquid beneath it and the upper surface thereof, to permit the passage of said fuel through said apertures.

15. The equipment of claim 14, wherein said apertures also permit the flow of liquid therethrough.

16. The equipment of claim 14, wherein said diffuser comprises a mass of metal that is disposed to serve as a heat sink.

17. The equipment of claim 14, wherein a grating having a thickness is disposed above the upper surface of said diffuser, and is formed with a reticulated structure that provides a plurality of separated, relatively small compartments that provide communication for said fuel between the upper surface of said diffuser and the atmosphere.

18. The equipment of claim 17, further comprising means to maintain the level of liquid in said tank to submerge at least a part of the thickness of said grating in said body of liquid.

19. The equipment of claim 18, wherein said fluid level submerges at least 50% of the thickness of said grating.

20. The equipment of claim 18, wherein said tank is equipped with an overflow drain for draining off excess liquid and excess applied flowable firefighting material, to maintain a substantially constant level in said tank.

21. The equipment of claim 20, wherein said drain comprises at least in said tank, an upright drain pipe, and wherein said equipment further comprises an igniter that is disposed to provide from said drain pipe an upwardly directed ignition flame for igniting said fuel.

22. The equipment of claim 17, wherein said equipment further comprises an igniter that is disposed centrally of said tank and to provide an upwardly directed ignition spark or flame for igniting fuel at the surface of the liquid.

23. Firefighter training equipment, comprising:
a tank for holding a body of water, said tank having a bottom and side wall;
means within said tank for releasing into said body of water fuel in the form of a plurality of separate, spaced-apart streams of fuel to rise through the water; and
a grating that is at least partially immersed in said body of water, said grating having a thickness and being formed with a reticulated fuel-dispersive structure that provides a plurality of separated, relatively small compartments that provide communication for said fuel from said body of water to the atmosphere above said grating.

24. The equipment of claim 21, comprising means to maintain the level of water in said tank to submerge at least a part of the thickness of said grating in said body of water.

25. The equipment of claim 24, wherein said level of water submerges at least 50% of the thickness of said grating.

26. The equipment of claim 24, wherein said tank is equipped with an overflow drain for drawing off excess water and any excess applied firefighting flowable material, to maintain a substantially constant level in said tank.

27. The equipment of claim 24, wherein the relatively small amounts of water that are disposed within said plurality of grating compartments respectively serve as a plurality of heat sinks during burning of said fuel.

28. The equipment of claim 27, comprising means for sensing the temperature of at least one of the grating and the water and monitoring means to deliver water to said tank to maintain the temperature of the monitored component.

29. The equipment of claim 24, wherein said means for maintaining the level of water in said tank to submerge at least a part of said grating further comprises an overflow drain for drawing off excess water and excess applied flowable firefighting material, to maintain a substantially constant level in said tank.

30. The equipment of claim 29, wherein said equipment further comprises an igniter that is disposed centrally of said tank and to provide an upwardly directed ignition flame for igniting said fuel.

31. The equipment of claim 29, wherein said drain comprises at least in said tank, an upright drain pipe, and wherein said equipment further comprises an igniter that is disposed to provide from said drain pipe an upwardly directed ignition flame for igniting said fuel.

32. The equipment of claim 29, comprising means for sensing the temperature of the water and monitoring means to deliver water to said tank to maintain a predetermined water temperature.

33. The equipment of claim 23, further comprising a fuel diffuser disposed in said tank at a position between said tank bottom and the surface of said water, said diffuser being provided with a plurality of apertures which define specific passages through which at least one of said fuel and said water can pass.

34. The equipment of claim 23, wherein said diffuser is formed of a heat conductive material.

35. The equipment of claim 25, further comprising a source of a visual impairment medium that is operable to deliver said impairment medium through said tank to a position adjacent to the surface of the water.

36. Firefighter training equipment comprising a tank for holding a body of water, said tank having a bottom and side wall;
means within said tank for releasing into said body of water beneath the surface of said body of water pressurized fuel in the form of a plurality of separate, spaced-apart streams of fuel; and a diffuser disposed in said tank at an elevation adjacent to but below the surface of said body of water, and above said fuel release means, said diffuser being formed with a plurality of vertically-extending holes disposed in a pattern between its upper and lower surfaces, said diffuser being coextensive in size with the area of the open upper end of the tank, and being interposed between the portion of said body of liquid beneath it and the upper surface thereof, to permit the passage of said fuel through said holes, and further comprising:

a grating disposed above the upper surface of said diffuser;

said grating being formed with a reticulated structure that provides a plurality of separated, relatively small compartments that provide communication for said fuel between the upper surface of said plate and the atmosphere; and means to maintain the level of water in said tank to submerge all of said diffuser and at least a part of the thickness of said grating in said body of water.

37. The equipment of claim 36, wherein said level of water submerges at least a portion of the thickness of said grating.

38. The equipment of claim 36, wherein said tank is equipped with an overflow drain for draining off excess water and excess applied flowable firefighting material, to maintain a substantially constant level in said tank.

39. The equipment of claim 38, wherein said drain comprises at least in said tank, an upright drain pipe, and wherein said equipment further comprises an igniter that is disposed to provide from said drain pipe an upwardly directed ignition spark or flame for igniting said fuel.

40. The equipment of claim 39, wherein the relatively small amounts of water that are disposed within said plurality of grating compartments respectively serve as a plurality of heat sinks during burning of said fuel.

41. The equipment of claim 40, comprising means for sensing the temperature of the water and monitoring means to deliver water to said tank to maintain a predetermined water temperature.

42. The equipment of claim 36, further comprising means for sensing the temperature of at least one of said grating and of said body of water, said temperature monitoring system being operable to deliver water to said tank to maintain the temperature of the sensed component at or below a predetermined temperature.

43. A process for creating a fire for use in training a firefighter, comprising:

injecting fuel under pressure into a body of water, beneath its surface, to create a plurality of bubbles that are spaced apart from each other, to rise through said water toward the surface of the water;

maintaining at the upper surface of said body of water a plurality of separate small compartments of water within interstices of a partially submerged support surface; and burning said fuel over a firefighter support surface and over said small compartments of water.

44. The process of claim 43, comprising maintaining the level of said body of water to submerge at least a portion of the thickness of said support surface.

45. The process of claim 43, further comprising intercepting said bubbles on the lower face of a perforated diffuser that is disposed beneath said grating, and directing said fuel bubbles to pass upwardly only through the perforations formed in said diffuser.

46. The process of claim 43, further comprising igniting said fuel with an upwardly directed ignition spark or flame.

47. The process of claim 43, further comprising maintaining the temperature of at least one of said body of water and said support surface at or below a predetermined temperature.

48. The process of claim 43, further comprising the step of introducing a visual impairment medium through said body of water and to the surface of said support surface.

* * * * *